United States Patent
Oishi et al.

(10) Patent No.: US 7,047,311 B2
(45) Date of Patent: May 16, 2006

(54) BANDWIDTH MANAGEMENT APPARATUS AND METHOD, PROGRAM THEREFOR AND RECORDING MEDIUM WITH THE PROGRAM RECORDED THEREON

(75) Inventors: Takahiro Oishi, Tokorozawa (JP); Masaaki Omotani, Sayama (JP); Kohei Shiomoto, Iruma (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 806 days.

(21) Appl. No.: 10/079,899

(22) Filed: Feb. 22, 2002

(65) Prior Publication Data

US 2002/0120745 A1 Aug. 29, 2002

(30) Foreign Application Priority Data

Feb. 23, 2001 (JP) ............................. 2001-048819
Apr. 20, 2001 (JP) ............................. 2001-121834

(51) Int. Cl.
*G06F 15/16* (2006.01)

(52) U.S. Cl. ................. 709/233; 709/224; 709/226; 709/227; 709/229; 709/233; 709/235; 709/249; 370/229; 370/230; 370/231; 370/236; 370/395.41

(58) Field of Classification Search ................ 709/224, 709/233, 235; 370/229–236, 252–253, 395.4, 370/395.41, 468, 231
See application file for complete search history.

(56) References Cited

U.S. PATENT DOCUMENTS 5,881,050 A 3/1999 Chevalier et al.
6,072,774 A * 6/2000 Natarajan et al. ............ 370/231
6,438,139 B1 * 8/2002 Huang et al. ................ 370/468
2002/0087713 A1 * 7/2002 Cunningham ............... 709/235

FOREIGN PATENT DOCUMENTS

JP 9-83546 3/1997

OTHER PUBLICATIONS

D. Rubenstein, et al., Computer Communications Review, vol. 29, No. 4, pp. 27-38, XP-000852187, "The Impact of Multicast Layering on Network Fairness", Oct. 1999.
X. Xiao, et al., IEEE Network, pp. 28-33, "Traffic Engineering with MPLS in the Internet", Mar./Apr. 2000.
T. Kimura, et al., Technical Report of IEICE, SSE2000-267, pp. 233-240, "Comparison of Diffserv Traffic Engineering Methods", Mar. 2001 (with English Abstract).
Atsushi Iwata, et al., "QOS Routing Algorithm for ATM Networks with Multiple Quality of Service Requirements", Technical Report of IEICE, SSE95-126, Dec. 1995, pp. 7-13, (with English Abstract).

* cited by examiner

*Primary Examiner*—Yves Dalencourt
(74) *Attorney, Agent, or Firm*—Oblon, Spivak, McClelland, Maier & Neustadt, P.C.

(57) ABSTRACT

Based on requested bandwidths received from all edge nodes and destination edge nodes, the total reservation of the bandwidths requested by respective edge nodes for each link is calculated, and the total value is subtracted from the maximum admissible bandwidth of the link to obtain the residual bandwidth, and it is decided whether a new requested bandwidth is less than the residual band of which link of the path to the destination edge node.

19 Claims, 12 Drawing Sheets

FIG. 3A1

TABLE 11

| SOURCE | BANDWIDTH |
|---|---|
| ND1 | |
| ND2 | |
| ND3 | |
| ND4 | |
| | |

FIG. 3A2

TABLE 11

| SOURCE | DESTINTION | BANDWIDTH |
|---|---|---|
| ND1 | ND2 | |
| ND1 | ND3 | |
| ND1 | ND4 | |
| ND2 | ND1 | |
| ND2 | ND3 | |
| ND2 | ND4 | |
| ND3 | ND1 | |
| ND3 | ND2 | |
| ND3 | ND4 | |
| ND4 | ND1 | |

FIG. 3B

TABLE 12

| LINK | PRE-RESERVED BANDWIDTH | MAX ADMISSIBLE BANDWIDTH | RESIDUAL BANDWIDTH |
|---|---|---|---|
| L12 | | | |
| L21 | | | |
| L13 | | | |
| L31 | | | |
| L14 | | | |
| L23 | | | |

FIG. 3C

TABLE 14T

| PATH | LINK |
|---|---|
| ND1-ND2 | $L_{12}$ |
| ND1-ND3 | $L_{12}, L_{23}$ |
| ND1-ND4 | $L_{14}$ |
| ND2-ND1 | $L_{21}$ |
| ND2-ND3 | $L_{23}$ |
| ND2-ND4 | $L_{23}, L_{34}$ |
| ND3-ND4 | $L_{34}$ |

| Link<br>From-To | Bandwidth<br>[Mb/s] |
|---|---|
| ND5-ND6 | 55 |
| ND8-ND7 | 65 |
| ND9-ND2 | 65 |
| ND10-ND4 | 53 |
| ND10-ND9 | 53 |

BANDWIDTH MANAGEMENT APPARATUS AND METHOD, PROGRAM THEREFOR AND RECORDING MEDIUM WITH THE PROGRAM RECORDED THEREON

BACKGROUND OF THE INVENTION

The present invention relates to a bandwidth management method and apparatus for use in a connectionless IP (Internet Protocol) communication network or the like which is free from the necessity of setting a connection prior to the start of communication and, more particularly, a bandwidth management method and apparatus for a communication network which guarantees the minimum communication bandwidth.

In a connectionless communication network like the IP communication network, there are no end-to-end paths predetermined. In other words, it is not predetermined over which path the input datagram packet is to be routed through the network. Upon input of the packet to one node in the network, the node router refers to its forwarding table and determines the link to which the packet is to be sent next in accordance with the destination address contained in the header of the packet.

The forwarding table is determined by an SPF (Shortest Path First) scheme. SPF is a table for selecting a path that minimizes the total cost of weighted values of links between the input (source) and output (destination) nodes. Accordingly, packets from the same input node to the same output node are always routed through the network over the same path. Since the packet routing by SPF takes place irrespective of individual traffic, however, particular paths or links in the network may sometimes become so congested with packets that required packet routing is impossible to achieve, allowing them to be lost or missing.

As a solution to this problem, there is available an architecture called Diffserv (Differentiated Services) (IETF RFC2475). This architecture sets a plurality of priority service classes to treat services differently to enhance the quality of communication over the Internet. Of the services, an EF (Expedited Forwarding) class (IETF RFC2475) is a service class that guarantees each user's contracted bandwidth (transmission rate expressed in Mbits/sec, for instance). But it is the bandwidth for packet input that the user contracts, and the destination of the packet is unknown.

For example, in such an IP network ND as depicted in FIG. 1 which contains nodes ND1 to ND5 connected by links $L_{12}$, $L_{21}$, $L_{13}$, $L_{31}$, $L_{14}$, $L_{41}$, $L_{15}$, $L_{51}$, $L_{23}$, $L_{32}$, $L_{25}$, $L_{52}$, $L_{34}$, $L_{43}$, the nodes ND1, ND2, ND3 are used as edge nodes connected to user apparatuses U1, U2, U3 or other networks to form a Diffserv network DNW, in which a bandwidth guarantee for each user belonging to the EF class or assured forwarding class, for example, U1, is required for the packet input to the edge node ND1. In FIG. 1 the edge node ND1, for instance, is shown to have connected thereto one user apparatus U1, but in practice, plural user apparatuses are connected to the edge node. This applies to the other edge nodes and those in the network that embodies the present invention as described later on. In the connectionless data transfer as in Diffserv, since no particular path is preset, the destination node of the packet unknown until it is actually input to the network and its destination information is read.

To provide bandwidth guarantees for the Diffserv users, it is necessary to confirm the bandwidth to be guaranteed for all possible traffic patterns over the Diffserv network. In practice, however, candidates for destination edge nodes are as many as the edge nodes forming the network, and consideration needs to be taken of all possible patterns as to how much traffic flows to which edge node. Letting N represent the number of edge nodes and K the number of steps of the bandwidth for admissible traffic to each edge node, the number of input traffic patterns for all the edge nodes is $(K+M-2)!/(N-2)!K!$. For example, when N=5 and K=5, the number of traffic patterns for all edge nodes is as large as $56^5$. In the actual network, the value N is far greater, and consequently, the number of possible traffic patterns further increases correspondingly; it is practically impossible to taken into account such an enormous number of traffic patterns.

SUMMARY OF THE INVENTION

It is therefore an object of the present invention to provide a bandwidth management apparatus and method that allow ease in estimating the admissible bandwidth for a new bandwidth reservation request of a user of the EF or assured forwarding class in the Diffserv network, thereby implementing the calculation of the admissible bandwidth in the network with low computation complexity.

Another object of the present invention is to provide a program for implementing the bandwidth management apparatus and method, and a recording medium with the program recorded thereon.

According to a first aspect of the present invention, a bandwidth management apparatus is intended for use in a network in which a plurality of nodes, including two or more edge nodes connected to other networks or users, are connected by links, the bandwidth management apparatus for managing the reservation of a bandwidth by each of said edge node, comprising:

a link-bandwidth table for recording a residual bandwidth of each of said links; and an admissible bandwidth calculating device for calculating an admissible bandwidth in response to a received bandwidth reservation request containing requested bandwidth information representing a requested bandwidth for reservation and destination information representing destination edge nodes;

wherein said admissible bandwidth calculating device includes: a residual bandwidth calculating part which decides whether the reservation of said requested bandwidth is unacceptable or acceptable, depending on whether the residual bandwidth of at least one of all links from an arbitrary one of said edge node to all of said destination edge nodes is less or more than a bandwidth necessary for reservation based on said requested bandwidth; and a bandwidth reservation part which, if the reservation of said requested bandwidth is acceptable, updates the residual bandwidth in said link-bandwidth table corresponding to each link of the shortest path to each destination edge node by subtracting said bandwidth necessary for reservation from said residual bandwidth.

The bandwidth management apparatus according to the first aspect of the invention may be adapted so that said bandwidth reservation part includes means for limiting the bandwidth reservation of the same request by the same edge node for each link to one reservation and updating said residual bandwidth.

According to a second aspect of the present invention, a bandwidth management apparatus is intended for use in a network in which a plurality of nodes, including two or more edge nodes connected to other networks or users, are connected by links, the bandwidth management apparatus for managing the reservation of a bandwidth by each of said edge node, comprising:

a link-bandwidth table for recording the maximum admissible bandwidth and a pre-reserved bandwidth of each of said links; and an admissible bandwidth calculating device for calculating an admissible bandwidth in response to a received bandwidth reservation request containing requested bandwidth information representing a requested bandwidth for reservation and destination information representing destination edge nodes;

wherein said admissible bandwidth calculating device includes: a residual bandwidth calculating part which calculates the residual bandwidth of each link of the shortest path to each of said destination edge nodes of said bandwidth reservation request from said pre-reserved bandwidth and said maximum admissible bandwidth of said link-bandwidth table, and decides whether the reservation of said requested bandwidth is unacceptable or acceptable, depending on whether the residual bandwidth of at least one of said links is less or more than a bandwidth necessary for reservation based on said requested bandwidth for reservation; and a bandwidth reservation part which, if the reservation of said requested bandwidth is acceptable, updates the residual bandwidth in said link-bandwidth table corresponding to each link of the shortest path to each destination edge node by subtracting said bandwidth necessary for reservation from said residual bandwidth.

The bandwidth management apparatus according to the second aspect of the invention may be adapted so that said bandwidth necessary for reservation is said requested bandwidth for reservation and that said bandwidth reservation part includes means for limiting the bandwidth reservation of the same request by the same edge node for each link to one reservation and updating said residual bandwidth.

The bandwidth management apparatus according to the first or second aspect of the invention may further comprise means for sending said bandwidth reservation request to said edge nodes except that making said bandwidth reservation request when it is decided that the reservation of said requested bandwidth is acceptable.

In the bandwidth management apparatus according to the first or second aspect, said destination edge nodes may be all of said edge nodes except that making said bandwidth reservation request.

A bandwidth management method for said bandwidth management apparatus according to the first aspect of the invention, which refers to a link-bandwidth table with each link and its residual bandwidth recorded thereon and decides whether the reservation of a bandwidth in a received bandwidth reservation request is acceptable or not, comprises the steps of:

(a) responding to said received bandwidth reservation request containing a requested bandwidth for reservation and destinations to read out of said link-bandwidth table the residual bandwidth for said each link of the shortest path to each of said destinations;

(b) deciding whether the reservation of said requested bandwidth is acceptable or not, depending on whether the residual bandwidth of every link on the shortest paths to all of said destination edge nodes is more or less than a bandwidth necessary for reservation based on said requested bandwidth for reservation; and (c) updating said residual bandwidth in said link-bandwidth table corresponding to the link of each of said shortest paths to said destination edge nodes by subtracting said bandwidth necessary for reservation from said residual bandwidth when it is decided in said step (b) that said residual bandwidth is more than said bandwidth necessary for reservation.

In the above method, the updating of said residual bandwidth by all the edge nodes for the links of the shortest paths to said destination edge nodes based on the same bandwidth reservation request in said step (c) is limited to one time, and said bandwidth necessary for reservation is said requested bandwidth for reservation.

A bandwidth management method for said bandwidth management apparatus according to the second aspect of the invention, which refers to a link-bandwidth table with each link and its residual bandwidth recorded thereon and decides whether the reservation of a bandwidth in a received bandwidth reservation request is acceptable or not, comprises the steps of:

(a) responding to said received bandwidth reservation request containing a requested bandwidth for reservation and destinations to read out of said link-bandwidth table the residual bandwidth for said each link of the shortest path to each of said destinations and to calculate of said each link;

(b) deciding whether the reservation of said requested bandwidth is acceptable or not, depending on whether the residual bandwidth of every link on the shortest paths to all of said destination edge nodes is more or less than a bandwidth necessary for reservation based on said requested bandwidth for reservation; and (c) updating said residual bandwidth in said link-bandwidth table corresponding to the link of each of said shortest paths to said destination edge nodes by subtracting said bandwidth necessary for reservation from said residual bandwidth when it is decided in said step (b) that said residual bandwidth is more than said bandwidth necessary for reservation.

In the above method, the updating of said residual bandwidth by all the edge nodes for the links of the shortest paths to said destination edge nodes based on the same bandwidth reservation request in said step (c) is limited to one time, and said bandwidth necessary for reservation is said requested bandwidth for reservation.

In the above method for the bandwidth management apparatus according to the first or second aspect of the invention, said destination edge nodes are all of said edge nodes except that making said bandwidth reservation request.

A computer program that describes the procedure for implementing the above method also falls inside the scope of the present invention. Further, it also comes within the scope of the present invention to pre-record the program and read it out therefrom for execution by a computer.

BRIEF DESCRIPTION OF THE DRAWINGS

FIG. 3A1 is a diagram showing an example of an input traffic table;

FIG. 3A2 is a diagram showing another example of the input traffic table;

FIG. 3B is a diagram showing an example of a link-bandwidth table;

FIG. 3C is a diagram showing an example of a shortest path table;

DETAILED DESCRIPTION OF THE PREFERRED EMBODIMENTS

Figure 4:
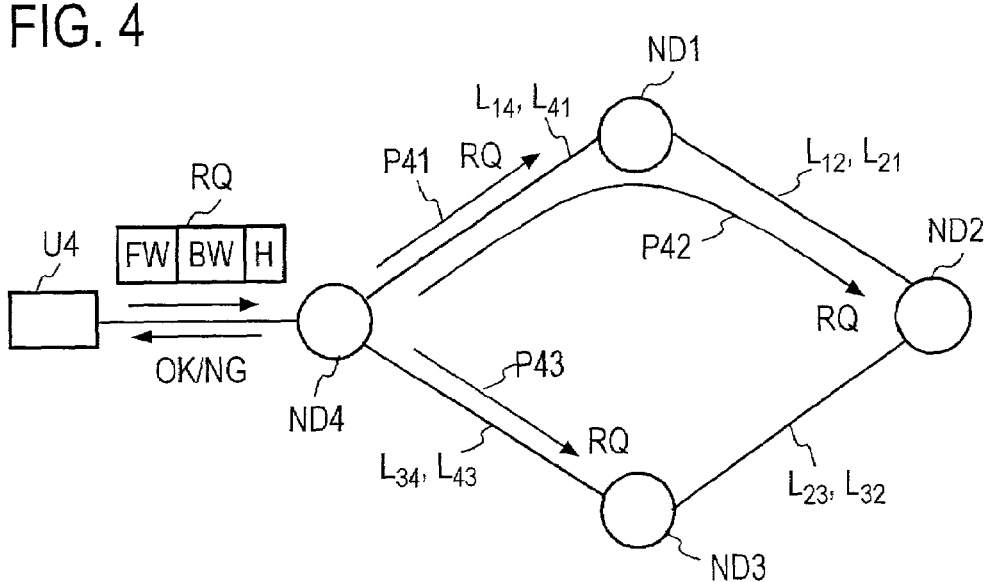
FIG. 4 is a diagram illustrating an example of the Diffserv network configuration to which the present invention is applied.

A description will be given, with reference to FIGS. 2 to 5, of the bandwidth management apparatus and method according to the present invention. FIG. 2 illustrates in block form a bandwidth management apparatus 100 of the present invention that is provided in each edge node of the Diffserv network depicted in FIG. 1. FIG. 4 is a flowchart showing the bandwidth management procedure that is followed by the bandwidth management apparatus 100.

Figure 1:
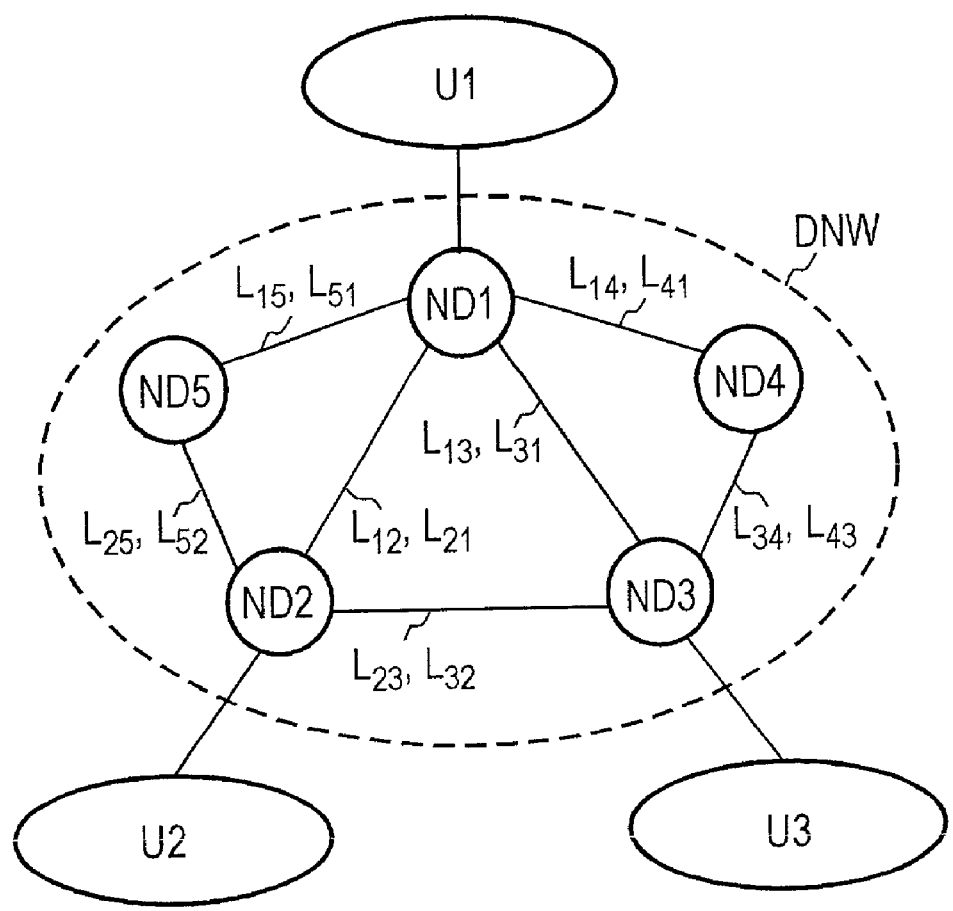
FIG. 1 is a schematic diagram showing an example of a conventional Diffserv network configuration.
Figure 2:
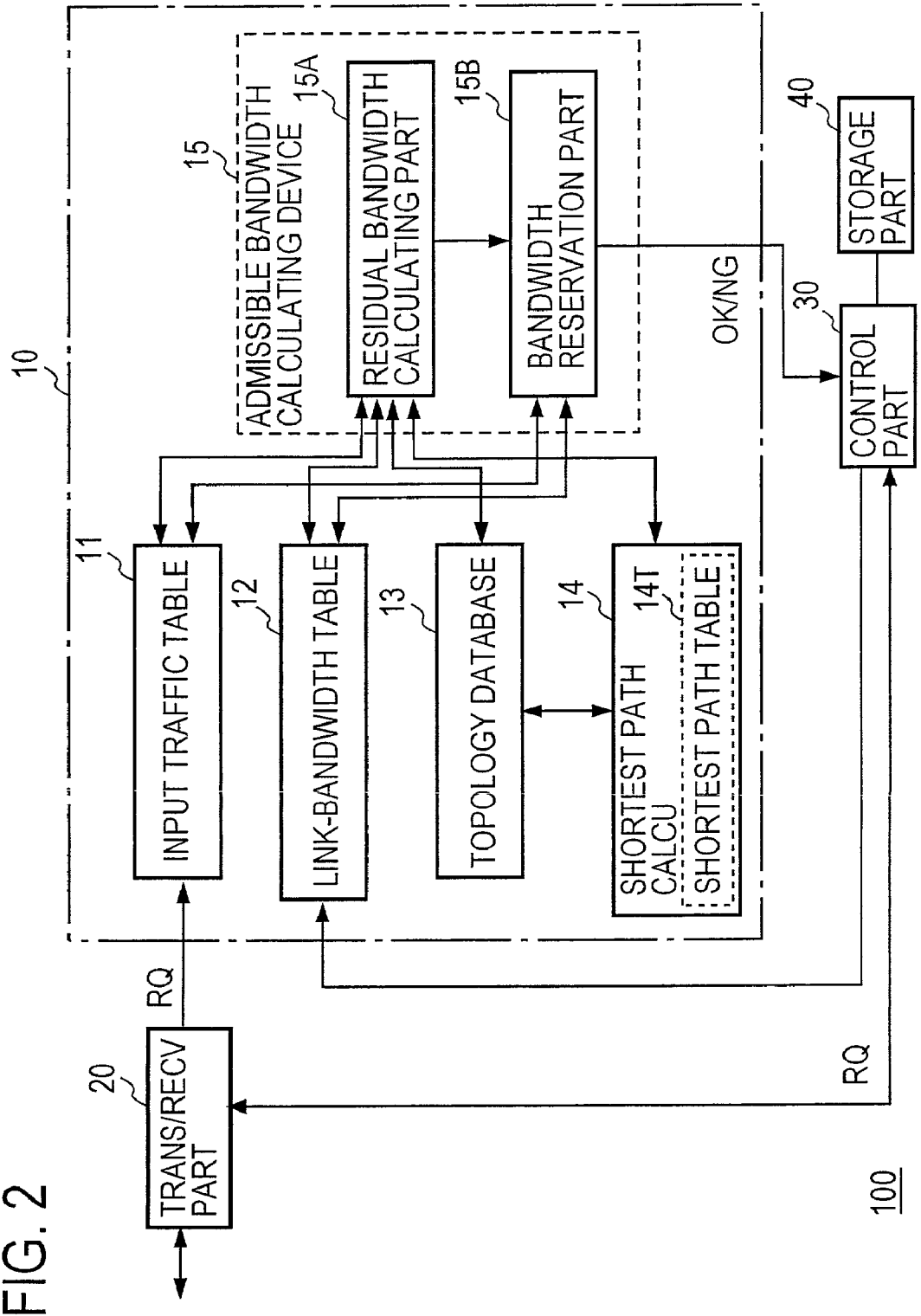
FIG. 2 is a block diagram of a bandwidth management apparatus 100 according to the present invention that is placed in each edge node.

According to the present invention, in such a Diffserv network DNW as shown in FIG. 1 in which the nodes ND1, ND2, . . . are connected by the links $L_{12}$, $L_{21}$, $L_{13}$, $L_{31}$, . . . , the nodes ND1, ND2 and ND3 shown to be connected to the users U1, U2, . . . or other networks are edge nodes, each of which has in its router the bandwidth management apparatus 100 depicted in FIG. 2. In the following description, the number of edge nodes is represented by N, which is an integer equal to or greater than 2.

In some instances, the network, to which the present invention is applied, responds to a user's request for bandwidth to offer two kinds of services, the one of which does not allow the network user to specify his desired destination edge node and the other of which allows the user to specify the destination edge node. In the former case, since the user Uj (where $1 \leq j \leq N$) connected to the edge node NDj needs to be capable of selecting an arbitrary destination, it is necessary to secure the user's requested bandwidth in the shortest path to every edge node NDi (where i≠j). This is equivalent to selecting all the edge nodes NDi (where i=1, . . . , N; i≠j) as destinations. In the latter case, the utilization efficiency is higher than in the former case since the user's requested bandwidth needs only to be secured in the shortest path to the specified destination edge node. In this instance, too, if all the edge nodes are specified as destinations, the requested bandwidth must be secured in the shortest paths to all the destination nodes.

The bandwidth management apparatus 100 of the edge node NDj, where $1 \leq j \leq N$, comprises a bandwidth management part 10, transmitting-receiving part 20, a control part 30 and a storage device 40 as depicted in FIG. 2. The bandwidth management part 10 is provided with an input traffic table 11 and a link-bandwidth table 12. In the system where no destination is specified, the input traffic table 11 is one that records the total bandwidth already reserved for traffic input to the Diffserv network from each source edge node NDi (i=1, . . . , N) as depicted in FIG. 3A1. In the system where the destination is specified, the input traffic table is such as shown in FIG. 3A2, in which the total bandwidth already reserved for respective paths is stored in correspondence with combinations of source and destination edge nodes NDj-NDi. The link-bandwidth table 12 records the maximum admissible bandwidth and pre-reserved bandwidth for each link $L_{hk}$ as depicted in FIG. 3B.

The bandwidth management part 10 is further provided with a topology database 13 for recording topology information representative of connections between nodes and links of the Diffserv network, a shortest path calculating part 14 for calculating the shortest path from each edge node to a desired destination edge node, and an admissible bandwidth calculating device 15 for calculating the residual bandwidth of each link to decide whether to accept a reservation for a new input traffic to the edge node NDj. The admissible bandwidth calculating device 15 is made up of a residual bandwidth calculating part 15A and a bandwidth reservation part 15B. In the storage device 40 there are stored programs for controlling the operations of the respective parts 11 to 14, 15 and 20 and programs for performing the processing by the shortest path calculating part 14 and the admissible bandwidth calculating device 15.

In the following description, the "path" will also mean the shortest path. The cost of each link is predetermined. The shortest path calculating part 14 has such an internal table 14T as shown in FIG. 3C. The shortest path calculating part 14 calculates the shortest path between each combination of two edge nodes NDj-NDi based on the information by the topology database 13, and creates the table 14T in which the link number $L_{hk}$ (where h≠k) of each link forming the shortest path is recorded corresponding to the two edge nodes as shown. Reference is made, as required, to the table 14T to retrieve the link number of the shortest path between two arbitrary edge nodes.

Upon receiving by the transmitting-receiving part 20 a bandwidth reservation request RQ from the user apparatus Uj connected to the edge node NDj or from other edge node NDi, if the request has no destination edge node nor does it specify its destination, the residual bandwidth calculating part 15A retrieves from the shortest path table 14T the link numbers of the links forming the shortest paths to all the other edge nodes, then reads out of the link-bandwidth table 12 the pre-reserved bandwidth and the maximum admissible bandwidth (i.e., the link capacity) for each link, then calculates the residual bandwidth that is the difference between the reserved bandwidth and the maximum admissible bandwidth, and decides whether the residual bandwidth is more than the bandwidth necessary for requested reservation. When the residual bandwidth is more than the bandwidth necessary for reservation in every link, it is decided that the requested bandwidth reservation is acceptable. On the other hand, when the residual bandwidth is less than the bandwidth necessary for reservation even in one link, it is decided that no reservation is accepted. In this instance, the bandwidth reservation part 15B sends a reservation-unacceptable signal NG to the control part 30, which, in turn, sends the signal NG to the user apparatus Uj from the transmitting-receiving part 30.

When the request for bandwidth reservation is acceptable, the band reservation part 15B updates the prestored bandwidth in the input traffic table 11 by adding it with the requested bandwidth in correspondence with the bandwidth-reservation requesting edge node (hereinafter referred to as a source edge node), then updates the pre-reserved bandwidth in the link-bandwidth table 12 by adding it with the reservation-requested bandwidth in correspondence with each of the above-mentioned retrieved links forming the respective shortest paths, and sends a reservation-acceptable signal OK to the control part 30. The control part 30 sends the signal OK to the source edge node, while at the same time it sends the bandwidth reservation request RQ to all the edge nodes of the network. On receiving the request RQ, each edge node performs the same processing as that in the case of receiving the afore-mentioned bandwidth reservation request RQ.

Figure 5:
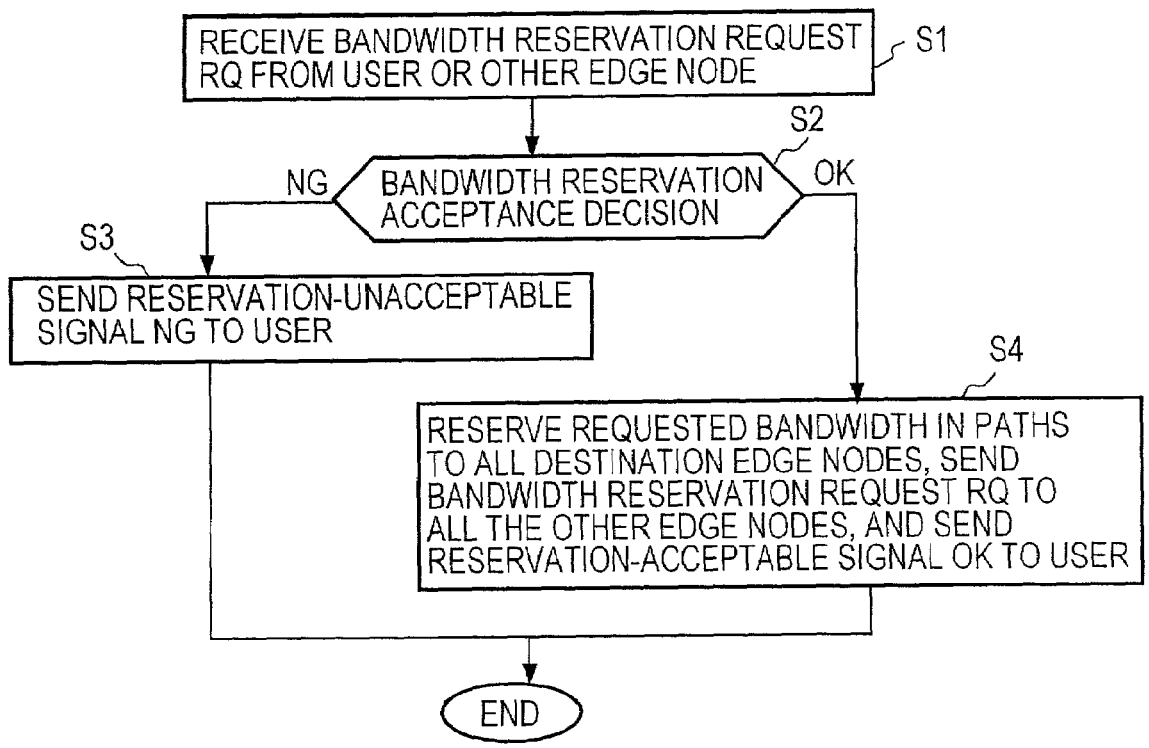
FIG. 5 is a flowchart showing the procedure for implementing the bandwidth management method according to the present invention.

FIG. 4 schematically shows the flow of signals when the user apparatus U4 sends a new bandwidth request to the edge node ND4 in the Diffserv network shown to have four edge nodes ND1 to ND4 for brevity sake. FIG. 5 is a flowchart showing the procedure that is followed by the edge node ND4 to handle the request.

The user apparatus U4 sends to the edge node ND4 a bandwidth reservation request packet RQ (i.e., the afore-mentioned bandwidth reservation request RQ) according to the EF or assured forwarding class service. The bandwidth reservation request packet RQ contains a header H, requested bandwidth information BW and destination information FW. The requested bandwidth information BW is the user's requested bandwidth, and the destination information FW is information for specifying the edge node to be used by the user as the destination. When the user does not specify the destination, or when the user cannot specify the destination according to the service he receives, the destination information FW is held blank or information specifying all the edge nodes is written. When one or more destinations are specified, the corresponding destination information is written in the FW field.

Step S1: Receives the user's bandwidth reservation request RQ with the bandwidth reservation request (and a destination-specifying request) written therein.

Step S2: Calculate the residual bandwidth of each link for the requested bandwidth (and the specified destination). For example, when no destination is specified, if the residual bandwidth of each of all the links $L_{41}$, $L_{43}$ and $L_{12}$ on the shortest paths P41, P42 and P43 from the edge node ND4 to all the other edge nodes ND1, ND2 and ND3 is more than the reservation-requested bandwidth, the edge node ND4 decides that the reservation of the requested bandwidth is acceptable, whereas when the residual bandwidth is less than the reservation-requested bandwidth even in one link, the edge node ND4 decides that the reservation of the requested bandwidth is unacceptable.

Step S3: If the reservation is unacceptable, send the reservation-unacceptable signal NG to the user apparatus U4.

Step S4: If the reservation is acceptable, add the reservation-requested bandwidth to the value prestored in the input traffic table 11 (FIG. 2) of the edge node ND4 to update it, then add the requested bandwidth to the pre-reserved bandwidth of corresponding link in the link-bandwidth table 12, then send the bandwidth reservation request RQ containing the requested bandwidth (and the specified destination) to all the other edge nodes ND1, ND2 and ND3 of the network, and at the same time, send the reservation-acceptable signal OK to the user apparatus U4.

When no destination is specified as mentioned above, there is a possibility that all the paths from the edge node ND4 to the other edge nodes ND1, ND2 and ND3 are used by the user U4, and hence, bandwidth reservations are made for all the paths, in which case the destination information FW slot need not be provided in the bandwidth reservation request RQ. That is, the absence of the destination information FW slot means that all the other edge nodes have been specified as destinations.

While the FIGS. 4–5 example has been described with reference to the case of receiving the bandwidth reservation request RQ from the user apparatus Uj connected to the edge node NDj, the above-described processing is performed as well when the edge node NDj receives from another edge node NDi the bandwidth reservation request RQ other than that sent from the edge node NDj.

A description will be given below of two embodiments of the FIG. 5 procedure for deciding whether to accept a bandwidth reservation.

Embodiment 1

Figure 6:
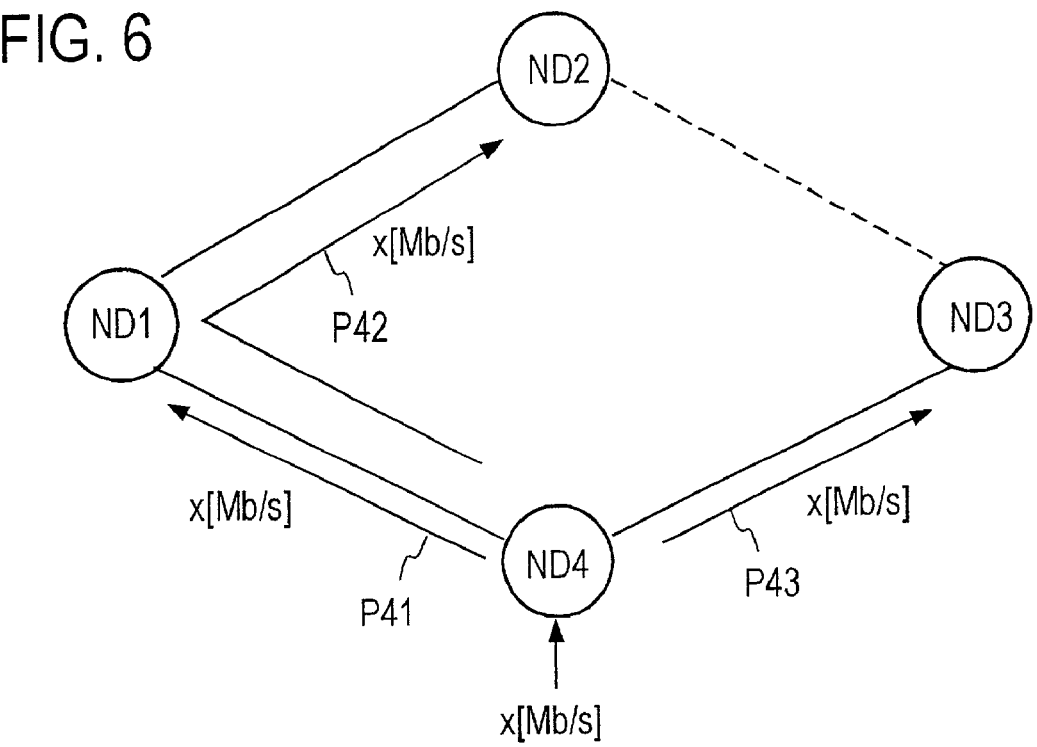
FIG. 6 is a diagram for explaining the bandwidth reservation according to a first embodiment of the present invention.

In this embodiment, if no destination is specified in a new x-[Mb/s] bandwidth reservation of the EF or assured forwarding class for input traffic to the edge node ND4, for instance, the same x-[Mb/s] bandwidth is reserved, as depicted in FIG. 6, for the shortest paths P42, P42 and P43 to the edge nodes ND1, ND2 and ND3 which are each selectable as the destination. This is intended to facilitate the traffic management throughout the Diffserv network.

Figure 7:
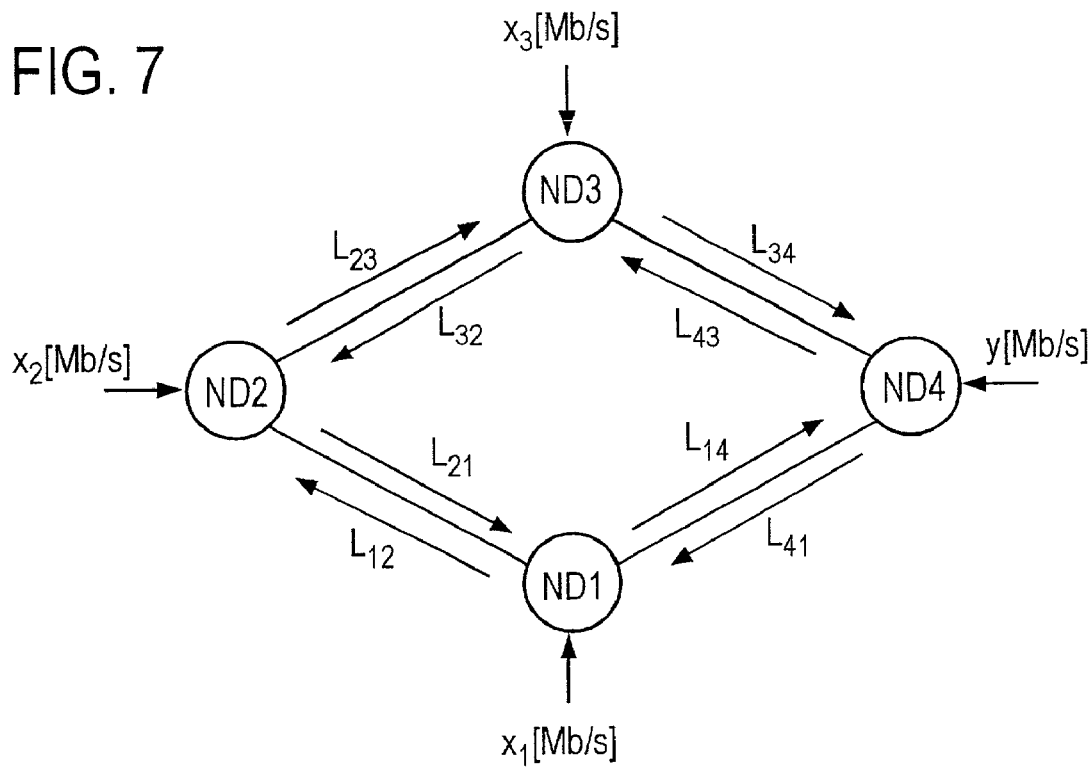
FIG. 7 is a diagram for explaining links between edge nodes in the network and the bandwidth reserved in each link.

For example, when bandwidths $x_1$, $x_2$, $x_3$ and $x_4$ have already been reserved for input traffic to the edge nodes ND1, ND2, ND3 and ND4 as depicted in FIG. 7, the following method is used to seek a band y [Mb/s] that can be newly reserved for the input traffic to the edge node ND4. Let it be assumed, in this example, that two edge nodes are connected by two links separately provided in opposite directions. For example, the edge nodes ND1 and ND2 are connected by the link $L_{12}$ from ND1 to ND2 and the link $L_{21}$ from ND2 to ND1, and each link has a predetermined maximum admissible bandwidth. As is the case with FIG. 6, letting the bandwidth to be reserved for the input traffic to the edge node ND1 be represented by $x_1$ [Mb/s], the bandwidth $x_1$ [Mb/s] has been reserved for each of the paths from the ND1 to the destination edge nodes ND2, ND3 and ND4. Assume that, for input traffic to each of the edge nodes ND2, ND3 and ND4, too, bandwidths $x_2$, $x_3$ and $x_4$ have already been reserved in paths (not shown) based on reservation bandwidths $x_2$, $x_3$ and $x_4$.

In the case of making a new reservation of the bandwidth y for the input traffic to the edge node ND4, a check is made to see which bandwidth has already been reserved for each link by the edge nodes ND1, ND2, ND3 and ND4, and based on the check results, it is decided whether the new bandwidth reservation for the input traffic to the edge node ND1 is acceptable.

Figure 8:
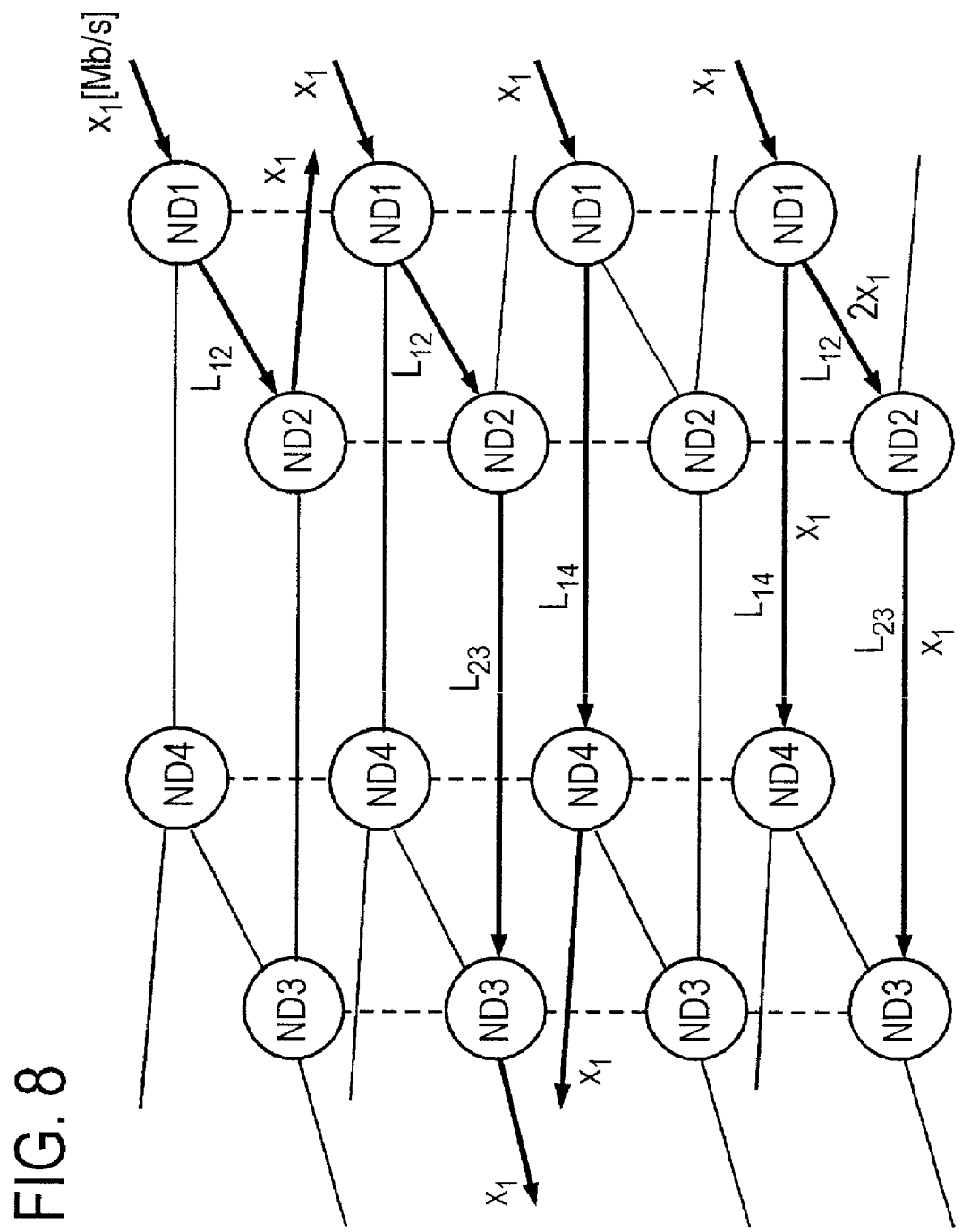
FIG. 8 is a diagram for explaining the reservation of a bandwidth in each link for input traffic to an edge node ND1 in FIG. 7.

To make the above decision, the bandwidth for each link is determined as described below with reference to FIG. 8, in which the reservation of the bandwidth x for the input traffic to the edge node ND1 is shown by three different layers for the thick-lined paths to three destination edge nodes ND2, ND3 and ND4. Assume that these paths are predetermined by the SPF scheme. The lowermost layer shows the total bandwidth reserved for the links by the three paths to these three destination edge nodes ND2, ND3 and ND4.

In the uppermost layer there are shown thick-lined path to the destination edge node ND2 and the link $L_{12}$ on the path, with the bandwidth $x_1$ [Mb/s] reserved on the link $L_{12}$. In the layer second from the above there are shown the thick-lined path to the destination edge node ND3 and the links $L_{12}$ and $L_{23}$ forming the path. The bandwidth $x_1$ [Mb/s] has been reserved on each of the links $L_{12}$ and $L_{23}$. In the layer third from the above there are shown the path to the destination edge node ND4 and the link $L_{14}$ forming the path, and the bandwidth $x_1$ [Mb/s] has been reserved in the link $L_{14}$ as well. The lowermost layer is a superimposed version of the three layers, showing the accumulated values of the bandwidths reserved on the respective links. In this example, the total pre-reserved bandwidth is $2x_1$ [Mb/s] on the link $L_{12}$ and $x_1$ [Mb/s] on the other links $L_{23}$ and $L_{14}$.

Though not shown, the reserved bandwidths $x_2$, $x_3$, and $x_4$ for the input traffic to the edge nodes ND2, ND3 and ND4 have also been calculated in the same manner as described above in respect of FIG. 8, and the bandwidth reservations for the respective links are accumulated and written as pre-reserved bandwidths in the link-bandwidth table 12 (FIG. 2) in correspondence with the reservation bandwidths $x_2$, $x_3$ and $x_4$ for input traffic to the edge nodes ND2, ND3 and ND4. Alternatively, the residual bandwidths on each link $L_{ij}$ (where i≠j), which is the result of subtraction of the pre-reserved bandwidth by each of the edge node ND1, ND2, ND3 and ND4 from the maximum admissible bandwidth of the link $L^{ij}$ by the residual bandwidth calculating part 15A, may be written in the table 12 in correspondence with the link as depicted in FIG. 3B.

In this way, the latest pre-reserved bandwidth (or residual bandwidth) of each link is stored in the link-bandwidth table 12; hence, it is possible to decide whether to accept the new reservation of the requested bandwidth y for the input traffic to the edge node NDj.

Figure 9:
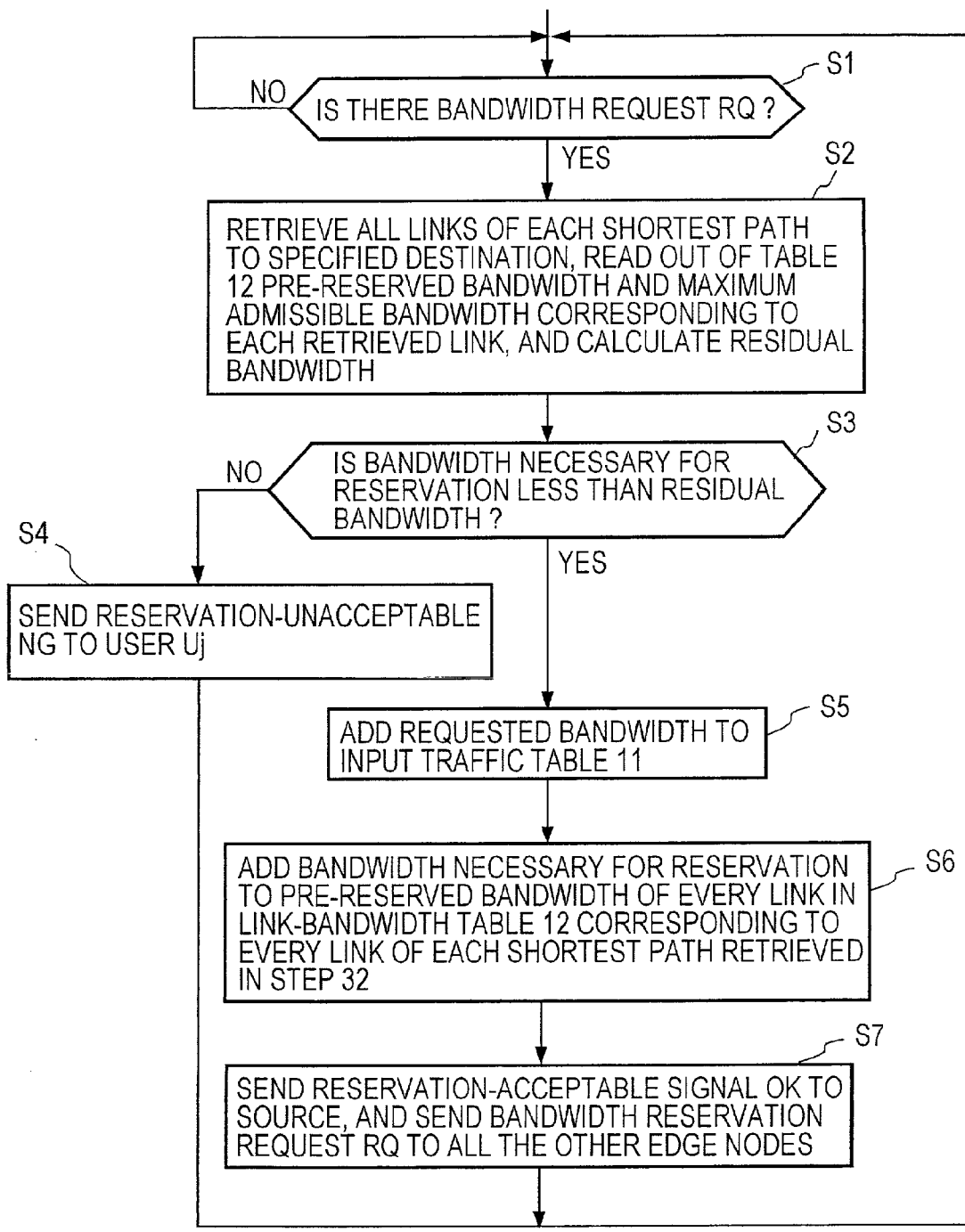
FIG. 9 is a flowchart showing a bandwidth reservation acceptance decision procedure according to the first embodiment of the invention.

FIG. 9 is a flowchart showing the procedure that the bandwidth management apparatus in the edge node NDj follows in response to the bandwidth reservation request RQ received from the user apparatus Uj or another edge node. Let the number of edge nodes in this case be represented by N.

Step S1: Make a check to see if the bandwidth reservation request RQ is received.

Step S2: If so, retrieve from the shortest path table 14T all links of each shortest path to the specified destination edge node, then read out the pre-reserved bandwidth and maximum admissible bandwidth corresponding to each retrieved link from the link number in the link-bandwidth table 12, and subtract the pre-reserved bandwidth from the maximum admissible bandwidth to detect the residual bandwidth. When the residual bandwidth is prerecorded in the link-bandwidth table 12 as depicted in FIG. 3B, the residual bandwidth needs only to be read out directly.

Step S3: Make a check to determine whether the requested bandwidth in the bandwidth reservation request RQ and the bandwidth requested by the destination edge node to reserve on each link are less than the residual bandwidth.

Step S4: If the reservation-requested bandwidth in every link is not less than the residual band, send the reservation-unacceptable signal NG to the source edge node having made the bandwidth reservation request RQ, and return to the step S1.

Step S5: If the reservation-requested bandwidth in every link is less than the residual bandwidth, add the reservation-requested bandwidth to the input traffic table 11 in correspondence with the pair of the source edge node and the destination edge node.

Step S6: Add the reservation-requested bandwidth to the pre-reserved bandwidth in the link-bandwidth table 12 for each of the links forming the shortest paths retrieved in step S2, thereby updating the pre-reserved bandwidth. When the residual bandwidth is recorded in the link-bandwidth table, the reservation-requested bandwidth is subtracted from the residual bandwidth to update it.

Step S7: Send the reservation-acceptable signal OK to the bandwidth reservation requesting edge node and the bandwidth reservation request RQ to all the other edge nodes, and return to step S1. The system may also be configured so that the bandwidth management apparatus 100 sends the signal NG to the source edge node only when the reservation is unacceptable but does not send the signal OK when the reservation is acceptable.

In the above, what is intended to mean by the reservation-requested bandwidth of each link is the sum total of the requested bandwidths for all the shortest paths along the link. According to this embodiment, in the case of the requested bandwidth $x_1$, the reservation-requested bandwidth for the link $L_{12}$ is $2x_1$ as referred to previously with reference to FIG. 8.

Figure 10:
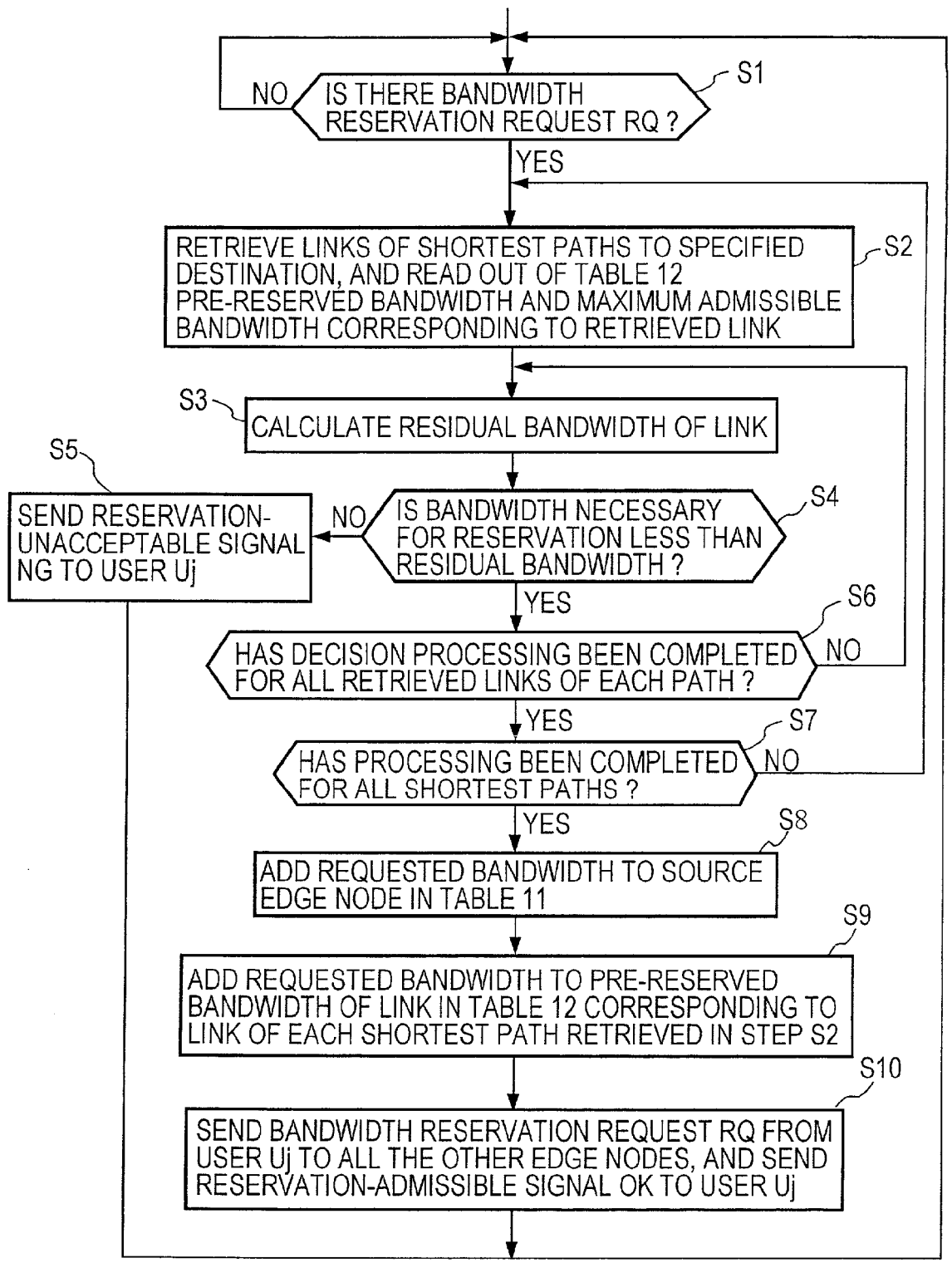
FIG. 10 is a flowchart showing modifications of steps S6 to S11 in FIG. 9.

The processing by steps S2 to S7 in FIG. 9 in response to the bandwidth reservation request RQ has been described to retrieve all the links of the all of the shorted paths to the specified destination, calculate the residual bandwidth in each of the retrieved links and make a check to determine if the reservation-requested bandwidth is less than the residual band in all the links, but it is also possible to calculate the residual bandwidth for each retrieved link and compare it with the reservation-requested bandwidth. FIG. 10 shows the procedure that the bandwidth management apparatus 100 follows in such a case.

Step S1: Make a check to see if the bandwidth reservation request RQ is received.

Step S2: Choose one of the destinations written in the received request RQ, then retrieve one link of the shortest path to the chosen destination, and read out the pre-reserved bandwidth and maximum admissible bandwidth of the retrieved link from the table 12.

Step S3: Calculate the residual bandwidth from the pre-reserved bandwidth and the maximum admissible bandwidth of the link.

Step S4: Make a check to determine whether the reservation-requested bandwidth is less than the residual bandwidth.

Step S5: If not, send the reservation-unacceptable signal NG to the reservation requesting source.

Step S6: If the reservation-requested bandwidth is less than the residual bandwidth, make a check to see if the processing of step S4 has been completed for all the links of that path, and if not so, choose the next link, and return to step S3.

Step S7: If the processing has been completed, make a check to see if the processing has been completed for the shortest paths to all destinations, and if not, choose the shortest path to the next destination, and return to step S2.

Step S8: If the processing has been completed for all the shortest paths, add the requested bandwidth to pre-reserved bandwidth of the resource edge node in the table 11 to update it.

Step S9: Add the requested bandwidth to the pre-reserved bandwidth of the link in the table 12 corresponding to the link of each shortest path retrieved in step S2.

Step S10: Send the reservation-acceptable signal OK to the source edge node and the bandwidth reservation request RQ to all the other edge nodes.

According to the procedure of FIG. 10, when it is found that the residual bandwidth is more than the requested bandwidth even in one link, it is decided immediately that the reservation is not acceptable, and no decision is made for the remaining link. Hence, this procedure has the advantage of less computational complexity involved.

As described above, according to this embodiment, when the bandwidth reservation request RQ is made, the requested bandwidth is reserved in the shorted paths to all destination edge nodes to limit an infinite number of traffic flow patterns to only one, permitting substantial reduction of the computational complexity. And it can be detected approximately whether the traffic of the requested bandwidth from the edge node NDj is admissible. With this algorithm, it is assumed that the input x [Mb/s] is sent intact to all the edge nodes, and consequently, the traffic distribution is estimated to be more safe than in the actual case.

Embodiment 2

In the first embodiment described above, the bandwidth management apparatus 100 responds to the bandwidth reservation request RQ for the input traffic to the edge node NDj to reserve the requested bandwidth x in each of the shortest paths from the edge node NDj to all the other edge nodes each specified as the destination of the traffic. In this instance, however, since different paths (to the edge nodes ND2 and ND3, for instance) are formed which pass through the same link (for example, $L_{12}$ in FIG. 8), the same bandwidth x is reserved in the same link a plurality of times as is evident from the description given above with reference to FIGS. 6 and 7—this is undesirable in terms of the link utilization efficiency. The second embodiment is intended to avoid such duplicate reservation of the same requested bandwidth in the same link.

Figure 11:
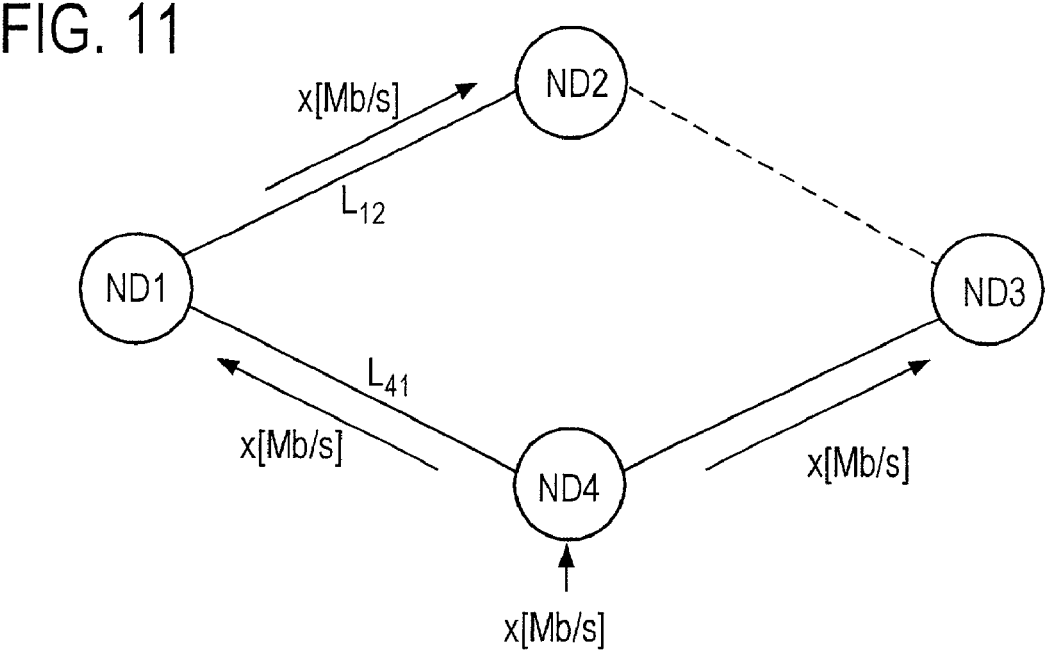
FIG. 11 is a diagram for explaining the bandwidth reservation according to a second embodiment of the present invention.

FIG. 11 is a schematic showing of the requested bandwidth reservation processing according to this embodiment. Assume that the shortest paths from the bandwidth reservation requesting edge node ND4 to all the other edge nodes each specified as the destination be predetermined as is the case of FIG. 6. In FIG. 11, the link $L_{41}$ is common to the paths from the edge node ND4 to the destination edge nodes ND1 and ND2, and when the requested bandwidth x is reserved in the link $L_{41}$ for either one of the paths, the same bandwidth x is not reserved in the link $L_{41}$ for the other path. Accordingly, in response to the input traffic to the edge node ND4, only the bandwidth x is reserved in the link $L_{41}$ between the edge nodes ND4 and ND1 as depicted in FIG. 10.

Figure 12:
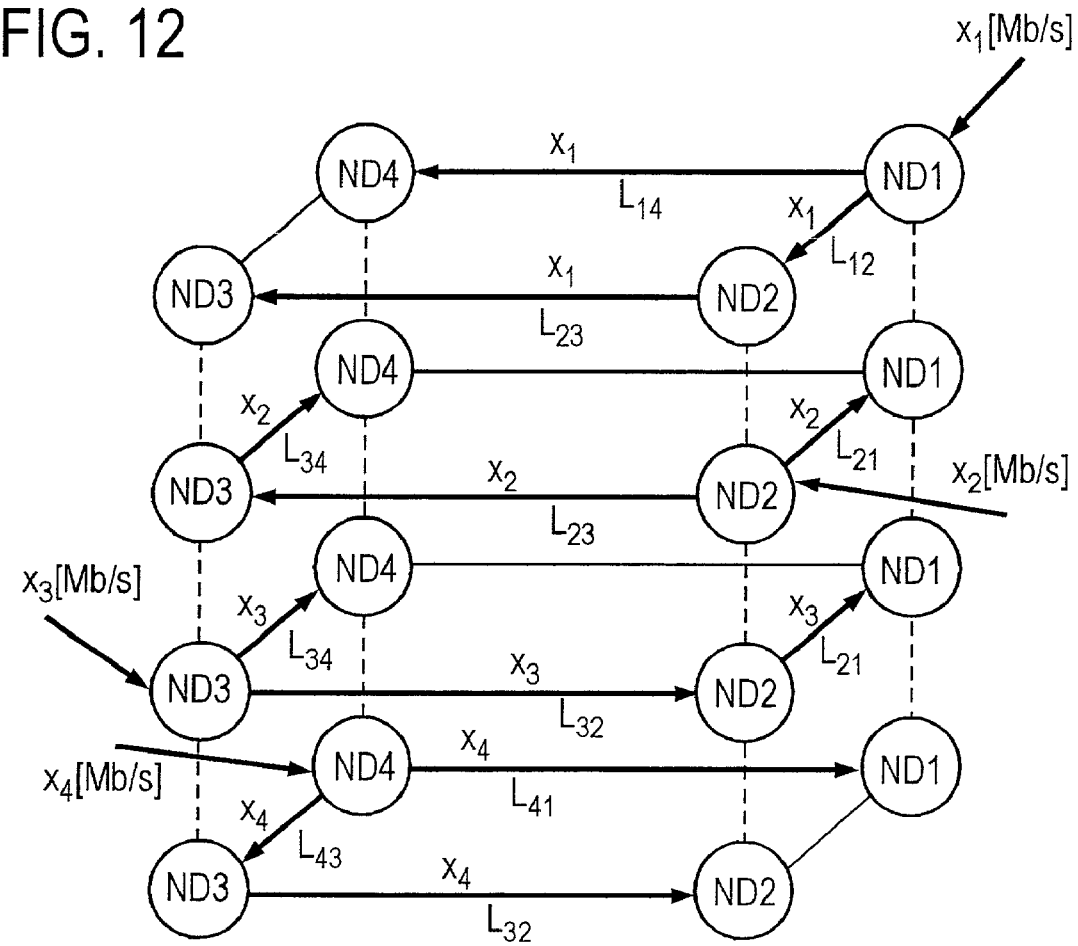
FIG. 12 is a diagram for explaining the bandwidth reservation by all edge nodes according to the second embodiment.

FIG. 12 is a schematic diagram in which reservations of bandwidths $x_1$, $x_2$, $x_3$ and $x_4$ made by the edge nodes ND1, ND2, ND3 and ND4 for respective links according to the bandwidth reservation acceptance decision scheme are separately shown in four layers. In the FIG. 12 example, the pre-reserved bandwidth of the link $L_{12}$, for instance, is only $x_1$ [Mb/s], the pre-reserved bandwidth of the link $L_{21}$ is $x_2+x_3$ [Mb/s], and the pre-reserved bandwidth of the link $L_{23}$ is $x_1+x_2$ [Mb/s].

Figure 13:
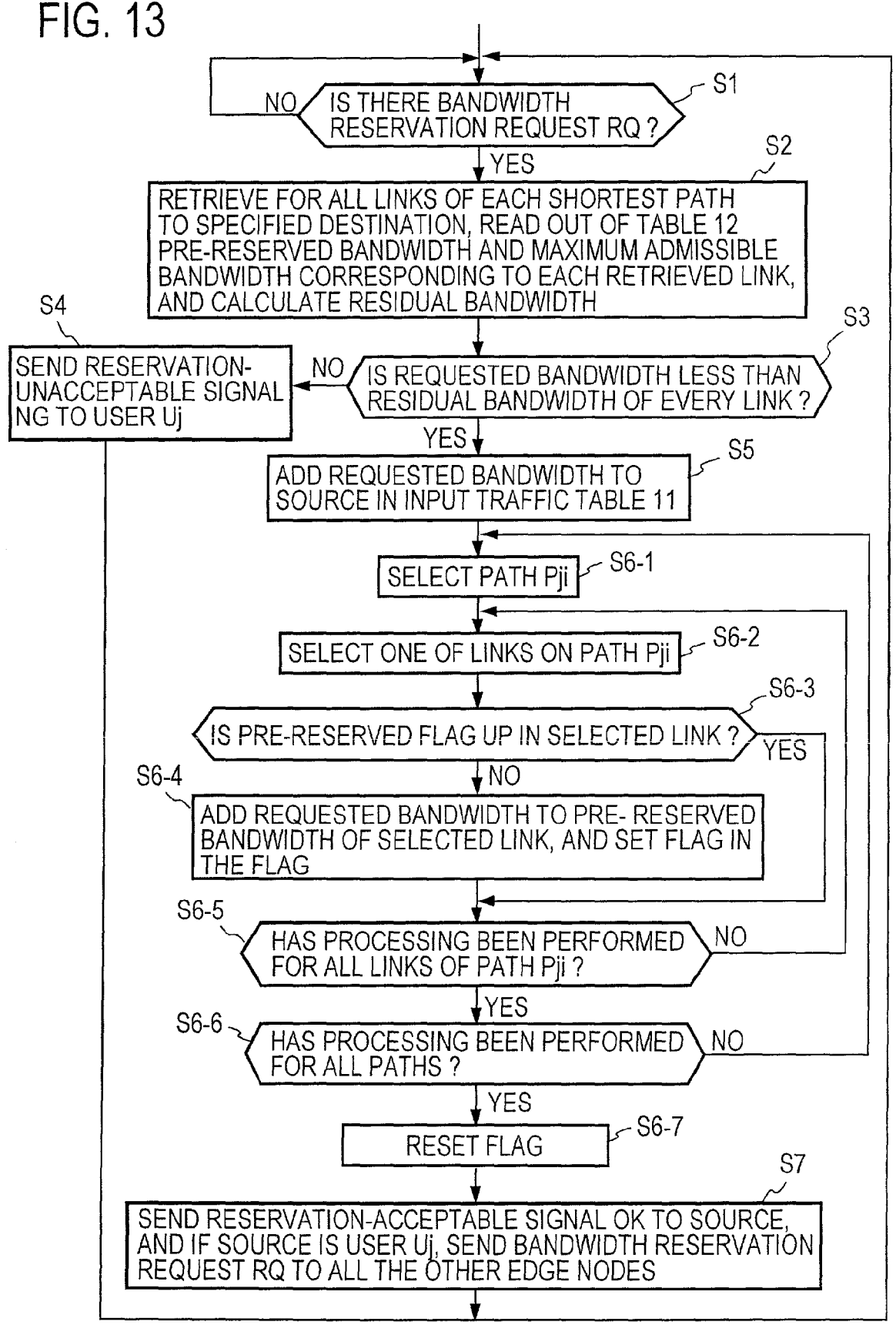
FIG. 13 is a flowchart illustrating a bandwidth reservation acceptance decision procedure according to the second embodiment of the invention.

FIG. 13 illustrates the procedure according to this embodiment that the bandwidth management apparatus 100 follows to respond to the bandwidth reservation request RQ from the user apparatus Uj to the edge node NDj or from the other edge nodes NDi.

The illustrated procedure is common to that of FIG. 9 in that, upon receipt of the bandwidth reservation request RQ in step S1, the bandwidth management apparatus 100 decides whether to allow the bandwidth reservation request and, in the case of the reservation being accepted, updates the pre-reserved bandwidth by steps S2 to S7. This embodiment differs, however, from the first embodiment in that the bandwidth reservation for each link based on the same bandwidth reservation request is limited to the requested bandwidth; accordingly, in step S3 in FIG. 13 the requested bandwidth is used as the bandwidth necessary for reservation and checked as to whether it is less than the residual bandwidth. Further, in step S6 in FIG. 9 the requested bandwidth is added in a manner to avoid its duplicate addition for the same link. The following is an example of the procedure corresponding to step S6 in FIG. 9.

Step S6-1: Select a path Pji from among the paths to specified destinations.

Step S6-2: Select one of the links on the path Pij.

Step S6-3: Make a check to see if a pre-reservation flag is up in the selected link and, if so, go to step S6-5.

Step S4: If the flag is down, add the requested bandwidth to the pre-reserved bandwidth of that link and set the flag in the link.

Step S6-5: Make a check to determine whether the processing for all the links of the path Pji has been completed and, if not, select the next link and return to step S6-2.

Step S6-6: If the processing for all the links of the selected path Pji has been completed, make a check to determine whether the processing for all the paths has been completed and if, not, select the next path and return to step S6-1.

Step S6-7: If the processing has been completed for all the paths, reset the flag.

It is also possible to apply steps S6-1 to S6-7 in FIG. 13 to step S9 in FIG. 9 to avoid the duplicate bandwidth reservation. In such an instance, the requested bandwidth is used as the reservation-requested bandwidth in step S4.

As described above, according to this embodiment, the reservation of the requested bandwidth in the link is preceded by making a check to see if the link is already reserved for the same request, and if it is pre-reserved, no additional reservation is made; hence, duplicate reservation can be avoided and the link utilization efficiency can be increased accordingly.

The first and second embodiments have been described in respect of the case where the destination information FW accompanying the requested bandwidth information BW specifies no particular destination edge node, that is, all the edge nodes are specified, but when one or more particular edge nodes NDi are specified, it is decided in step S3 in FIG. 9 or 13 whether the reservation-requested bandwidth is less than the residual bandwidth of which link on the paths Pji from the edge node NDi to the specified destination edge nodes NDi, and if so, the requested bandwidth is reserved for the links on those paths Pji in step S6-4 in FIG. 6 or 13.

The procedure of FIGS. 9, 10, or 13 may be prestored as a computer program in the storage device 30 so that it is read out thereof for execution by the control part 30. In such an instance, the processing by the shortest path calculating part 14 and the admissible bandwidth calculating device 15 is implemented by executing the program read out from the storage device 30.

Further, while the first and second embodiment have been described to have the bandwidth management apparatus 100 placed in each edge node, it may also be disposed at one or more locations on the network, in which case, on receiving the bandwidth reservation request RQ from respective edge node, each bandwidth management apparatus decides whether to accept the requested bandwidth reservation and sends the decision result to the edge node.

Moreover, in the first and second embodiment the link-bandwidth table 12 has recorded thereon the pre-reserved bandwidth, but the residual bandwidth may be replaced for the pre-reserved bandwidth, in which case, upon each new bandwidth reservation for each link, the reservation-requested bandwidth is subtracted from the corresponding residual bandwidth in the link-bandwidth table 12 to update it. That is, in step S6 in FIGS. 9 and 13 and step S9 in FIG. 10, the maximum admissible bandwidth of each link is used as the initial value of the residual bandwidth, and each time the bandwidth reservation request is decided to be allowed, the reservation-requested bandwidth is subtracted from the residual bandwidth of the link to update it. Naturally, in step S2 in FIGS. 9, 10 and 13 the residual bandwidth corresponding to the retrieved link may needs only to be read out of the link-bandwidth table 12.

Figures 14A, 14B:
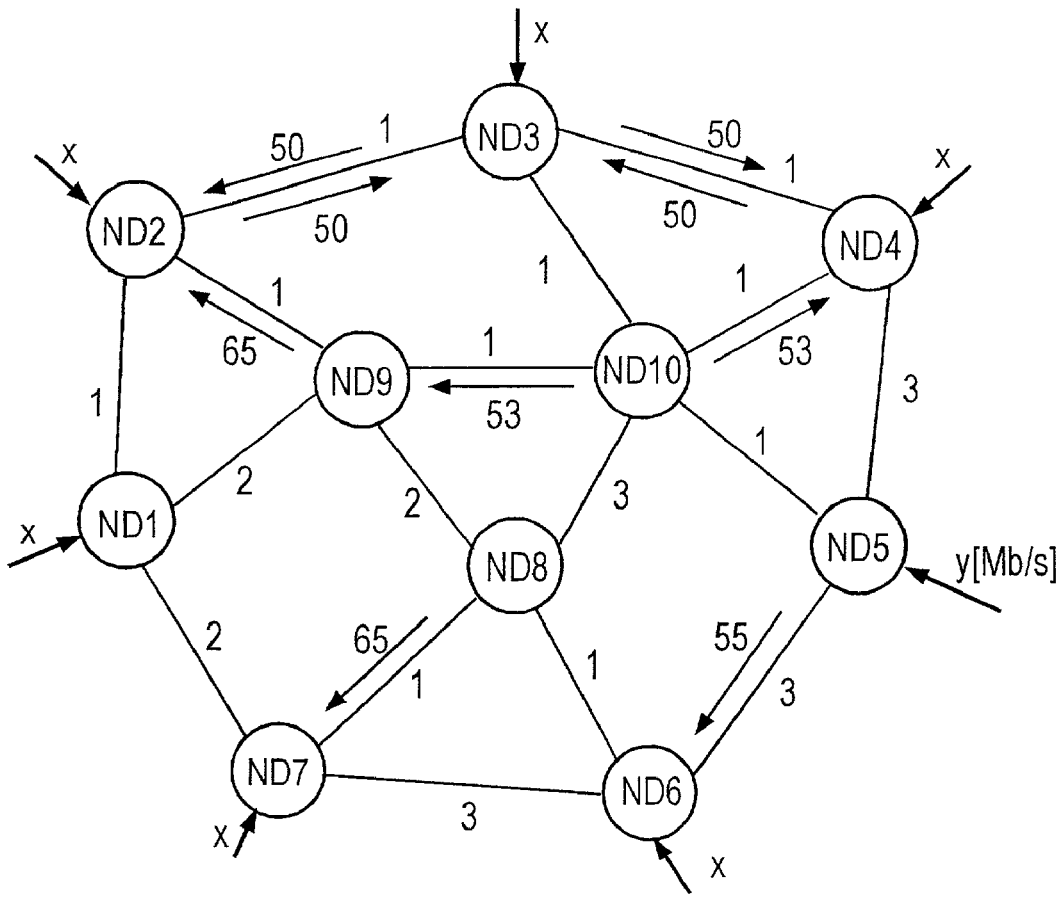
FIG. 14A is a diagram schematically depicting a network configuration used for evaluating the first and second embodiments by simulations.
FIG. 14B is a table showing the maximum admissible bandwidths of some links in the network of FIG. 14A.
Figure 15:
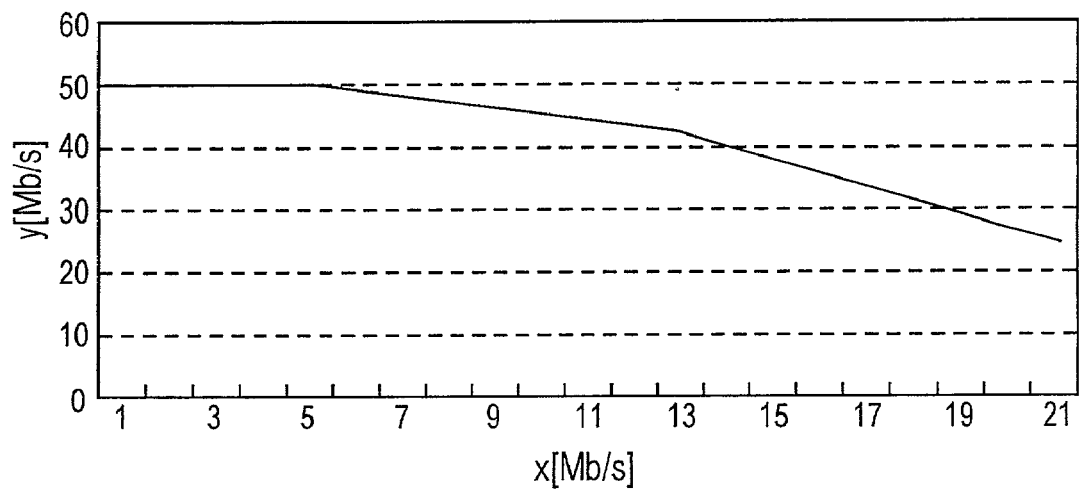
FIG. 15 is a graph showing the maximum value of the requested bandwidth that is admissible by the procedure of FIG. 9.
Figure 16:
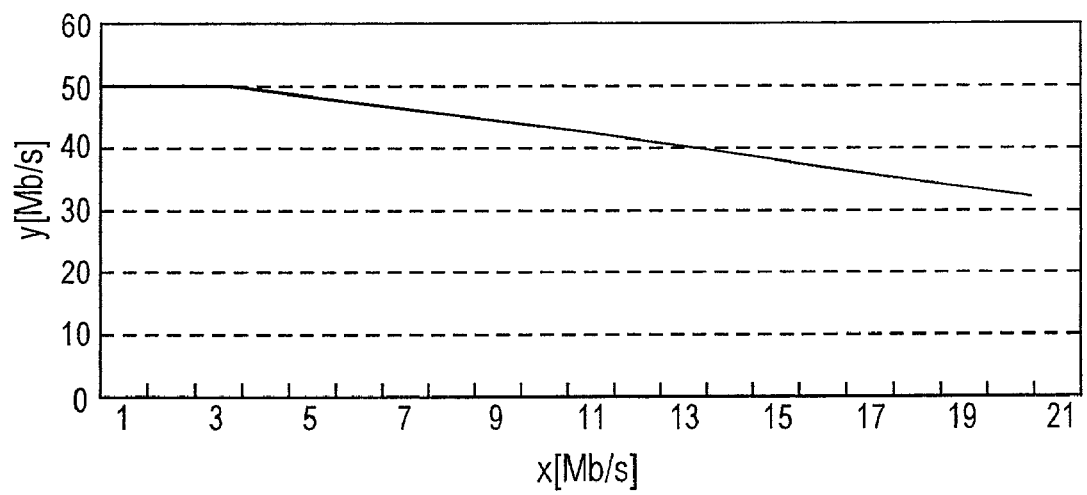
FIG. 16 is a graph showing the maximum value of the requested bandwidth that is admissible by the procedure of FIG. 13.

FIG. 14A shows an example of the network for evaluating the present invention by simulations. FIGS. 15 and 16 are graphs in which the maximum values of the requested bandwidth, which are decided to be admissible in the network by the procedures depicted in FIGS. 9 and 11, are each expressed as a function of the bandwidth to be reserved by each edge node (regarded as the maximum input traffic) x.

The network of FIG. 14A is composed of a total of 10 nodes (ND1 to ND10), seven of which are edge nodes (ND1 to ND7) and three of which are core nodes (ND8 to ND10). In the illustrated network the maximum admissible bandwidth of links is set at 50 [Mb/s] except the links shown in the table of FIG. 14B, and the cost of each link is indicated by the numerical value attached thereto and equal in two directions.

For the sake of simplicity, the input bandwidths from the edge nodes except ND5 are all set at x [Mb/s]; the bandwidth y [Mb/s] admissible to the edge node ND5 obtained by the FIG. 9 procedure of the first embodiment is shown in FIG. 15, and the bandwidth y [Mb/s] by the FIG. 13 procedure of the second embodiment is shown in FIG. 16.

As will be seen from FIGS. 15 and 16, the maximum admissible bandwidth y in either case remains at a constant value 50 Mb/s irrespective of the value x until x=5 Mb/s, and thereafter the value of the bandwidth y decreases as the value x increases. Moreover, the link utilization efficiency is increased by the FIG. 13 procedure that does not involve the duplicate reservation; the value of the maximum admissible bandwidth y is larger in the second embodiment than in the first embodiment as is evident from a comparison of them at 20 MB/s in the bandwidth x.

EFFECT OF THE INVENTION

As described above, according to the present invention, the use of the proposed algorithm permits reduction of the number of patterns to only one irrespective of the number N of edge nodes to which a datagram of x [Mb/s], and the admissible bandwidth of a new datagram can easily be estimated with low computational complexity. The use of the algorithm of the present invention markedly suppresses the computational complexity in a small-scale network as well.

What is claimed is:

1. A bandwidth management apparatus for use in a network in which a plurality of nodes, including two or more edge nodes connected to other networks or users, are connected by links, said bandwidth management apparatus for managing the reservation of a bandwidth by each of said edge node, comprising:
a link-bandwidth table for recording a residual bandwidth of each of said links; and
an admissible bandwidth calculating device for calculating an admissible bandwidth in response to a received bandwidth reservation request containing requested bandwidth information representing a requested bandwidth for reservation and destination information representing destination edge nodes;
wherein said admissible bandwidth calculating device includes: a residual bandwidth calculating part which decides whether the reservation of said requested bandwidth is unacceptable or acceptable, depending on whether the residual bandwidth of at least one of all links from an arbitrary one of said edge node to all of said destination edge nodes is less or more than a bandwidth necessary for reservation based on said requested bandwidth; and a bandwidth reservation part which, if the reservation of said requested bandwidth is acceptable, updates the residual bandwidth in said link-bandwidth table corresponding to each link of the shortest path to each destination edge node by subtracting said bandwidth necessary for reservation from said residual bandwidth.

2. A bandwidth management apparatus for use in a network in which a plurality of nodes, including two or more edge nodes connected to other networks or users, are connected by links, said bandwidth management apparatus for managing the reservation of a bandwidth by each of said edge node, comprising:
a link-bandwidth table for recording the maximum admissible bandwidth and a pre-reserved bandwidth of each of said links; and
an admissible bandwidth calculating device for calculating an admissible bandwidth in response to a received bandwidth reservation request containing requested bandwidth information representing a requested bandwidth for reservation and destination information representing destination edge nodes;
wherein said admissible bandwidth calculating device includes: a residual bandwidth calculating part which calculates the residual bandwidth of each link of the shortest path to each of said destination edge nodes of said bandwidth reservation request from said pre-reserved bandwidth and said maximum admissible bandwidth of said link-bandwidth table, and decides whether the reservation of said requested bandwidth is unacceptable or acceptable, depending on whether the residual bandwidth of at least one of said links is less or more than a bandwidth necessary for reservation based on said requested bandwidth for reservation; and a bandwidth reservation part which, if the reservation of said requested bandwidth is acceptable, updates the residual bandwidth in said link-bandwidth table corresponding to each link of the shortest path to each destination edge node by subtracting said bandwidth necessary for reservation from said residual bandwidth.

3. The apparatus of claim 1, wherein said bandwidth reservation part includes means for limiting the bandwidth reservation of the same request by the same edge node for each link to one reservation and updating said residual bandwidth, and wherein said bandwidth necessary for reservation is said requested bandwidth for reservation.

4. The apparatus of claim 2, wherein said bandwidth reservation part includes means for limiting the bandwidth reservation of the same request by the same edge node for each link to one reservation and updating said residual bandwidth, and wherein said bandwidth necessary for reservation is said requested bandwidth for reservation.

5. The apparatus of any one of claims 1, 2, 3, and 4, further comprising means for sending said bandwidth reservation request to said edge nodes except that making said bandwidth reservation request when it is decided that the reservation of said requested bandwidth is acceptable.

6. The apparatus of any one of claims 1, 2, 3, and 4, wherein said destination edge nodes are all of said edge nodes except said edge node making said bandwidth reservation request.

7. A bandwidth management method for said bandwidth management apparatus of claim 1, which refers to the link-bandwidth table with each link and its residual bandwidth recorded thereon and decides whether the reservation of the requested bandwidth in the received bandwidth reservation request is acceptable or not, said method comprising the steps of:
  (a) responding to said received bandwidth reservation request containing a requested bandwidth for reservation and destinations to read out of said link-bandwidth table the residual bandwidth for said each link of the shortest path to each of said destinations;
  (b) deciding whether the reservation of said requested bandwidth is acceptable or not, depending on whether the residual bandwidth of every link on the shortest paths to all of said destination edge nodes is more or less than a bandwidth necessary for reservation based on said requested bandwidth for reservation; and
  (c) updating said residual bandwidth in said link-bandwidth table corresponding to the link of each of said shortest paths to said destination edge nodes by subtracting said bandwidth necessary for reservation from said residual bandwidth when it is decided in said step (b) that said residual bandwidth is more than said bandwidth necessary for reservation.

8. A bandwidth management method for said bandwidth management apparatus of claim 2, which refers to the link-bandwidth table with each link and its residual bandwidth recorded thereon and decides whether the reservation of the requested bandwidth in the received bandwidth reservation request is acceptable or not, said method comprising the steps of:
  (a) responding to said received bandwidth reservation request containing a requested bandwidth for reservation and destinations to read out of said link-bandwidth table the residual bandwidth for said each link of the shortest path to each of said destinations and to calculate of said each link;
  (b) deciding whether the reservation of said requested bandwidth is acceptable or not, depending on whether the residual bandwidth of every link on the shortest paths to all of said destination edge nodes is more or less than a bandwidth necessary for reservation based on said requested bandwidth for reservation; and
  (c) updating said residual bandwidth in said link-bandwidth table corresponding to the link of each of said shortest paths to said destination edge nodes by subtracting said bandwidth necessary for reservation from said residual bandwidth when it is decided in said step (b) that said residual bandwidth is more than said bandwidth necessary for reservation.

9. The method of claim 7, wherein the updating of said residual bandwidth by all the edge nodes for the links of the shortest paths to said destination edge nodes based on the same bandwidth reservation request in said step (c) is limited to one time, and wherein said bandwidth necessary for reservation is said requested bandwidth for reservation.

10. The method of claim 8, wherein the updating of said residual bandwidth by all the edge nodes for the links of the shortest paths to said destination edge nodes based on the same bandwidth reservation request in said step (c) is limited to one time, and wherein said bandwidth necessary for reservation is said requested bandwidth for reservation.

11. The method of any one of claims 7, 8, 9 and 10, further comprising the step of:
  (d) sending said bandwidth reservation request to said edge nodes except that making said bandwidth reservation request when it is decided in said step (c) that the reservation of said requested bandwidth is acceptable.

12. The method of any one of claims 7, 8, 9 and 10, wherein said destination edge nodes are all of said edge nodes except said edge node making said bandwidth reservation request.

13. A computer program product storing instructions for execution on a computer system, for implementing a bandwidth management method in said bandwidth management apparatus of claim 1, said program when executed by the computer system, causes the computer system to perform:
  (a) instructions for responding to said received bandwidth reservation request containing a requested bandwidth for reservation and destinations to read out of said link-bandwidth table the residual bandwidth for said each link of the shortest path to each of said destinations;
  (b) instructions for deciding whether the reservation of said requested bandwidth is acceptable or not, depending on whether the residual bandwidth of every link on the shortest paths to all of said destination edge nodes is more or less than a bandwidth necessary for reservation based on said requested bandwidth for reservation; and
  (c) instructions for updating said residual bandwidth in said link-bandwidth table corresponding to the link of each of said shortest paths to said destination edge nodes by subtracting said bandwidth necessary for reservation from said residual bandwidth if it is decided in said step (b) that said residual bandwidth is more than said bandwidth necessary for reservation.

14. The computer program product of claim 13, wherein the updating of said residual bandwidth by all the edge nodes for the links of the shortest paths to said destination edge nodes based on the same bandwidth reservation request in said sep (c) is limited to one time, and wherein said bandwidth necessary for reservation is said requested bandwidth for reservation.

15. A computer program product storing instructions for execution on a computer system, for implementing a bandwidth management method for said bandwidth management apparatus of claim 2, said program when executed by the computer system, causes the computer system to perform:
- (a) instructions for responding to said received bandwidth reservation request containing a requested bandwidth for reservation and destinations to read out of said link-bandwidth table the residual bandwidth for said each link of the shortest path to each of said destinations and to calculate of said each link;
- (b) instructions for deciding whether the reservation of said requested bandwidth is acceptable or not, depending on whether the residual bandwidth of every link on the shortest paths to all of said destination edge nodes is more or less than a bandwidth necessary for reservation based on said requested bandwidth for reservation; and (c) instructions for updating said residual bandwidth in said link-bandwidth table corresponding to the link of each of said shortest paths to said destination edge nodes by subtracting said bandwidth necessary for reservation from said residual bandwidth when it is decided in said step (b) that said residual bandwidth is more than said bandwidth necessary for reservation.

16. The computer program product of claim 15, wherein the updating of said residual bandwidth by all the edge nodes for the links of the shortest paths to said destination edge nodes based on the same bandwidth reservation request in said step (c) is limited to one time, and wherein said bandwidth necessary for reservation is said requested bandwidth for reservation.

17. The computer program product of any one of claims 13, 15, 14 and 16, further comprising:
- (d) instructions for sending said bandwidth reservation request to said edge nodes except that making said bandwidth reservation request when it is decided in said step (c) that the reservation of said requested bandwidth is acceptable.

18. The computer program product of any one of claims 13, 15, 14 and 16, wherein said destination edge nodes are all of said edge nodes except said edge node making said bandwidth reservation request.

19. A recording medium having recorded thereon said computer program product of claim 13 or 15.

* * * * *